(12) United States Patent
Nam et al.

(10) Patent No.: US 10,303,019 B2
(45) Date of Patent: May 28, 2019

(54) LIGHT VALVE PANEL AND LIQUID CRYSTAL DISPLAY USING THE SAME

(71) Applicant: LG Display Co., Ltd., Seoul (KR)

(72) Inventors: Sangjin Nam, Cheonan-si (KR); Ooksang Yoo, Paju-si (KR); Kyujin Kim, Goyang-si (KR); Seungjin Yoo, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/605,347

(22) Filed: May 25, 2017

(65) Prior Publication Data

US 2017/0343866 A1 Nov. 30, 2017

(30) Foreign Application Priority Data

May 31, 2016 (KR) ........................ 10-2016-0067777

(51) Int. Cl.
*G02F 1/1333* (2006.01)
*G02F 1/1335* (2006.01)
(Continued)

(52) U.S. Cl.
CPC ........ *G02F 1/13471* (2013.01); *G02F 1/1336* (2013.01); *G02F 1/134309* (2013.01);
(Continued)

(58) Field of Classification Search
CPC ............ G02F 1/134309; G02F 1/1336; G02F 1/3471; G02F 2001/133601; G02F 2001/133388; G02F 1/133512; G02F 1/163209; G02F 1/0316; G02F 1/1343; G02F 1/13439; G02F 1/136286; G02F 1/155; G02F 1/1393; G02F 1/1395; G02F 2001/1357; G02F 2001/136218; G02F 2001/136295; G02F 2001/1552; G02F 2001/1555; G02F 2001/1557; G02F 2001/12; G02F 2001/121; H01J 11/44; H01J 2211/444; H01J 2329/323; H01J 29/327; G09G 2300/0421;
(Continued)

(56) References Cited

U.S. PATENT DOCUMENTS

| 6,172,729 B1* | 1/2001 | Ikeda ................ G02F 1/134336 349/145 |
| 2006/0103641 A1* | 5/2006 | Marhefka ............. G02F 1/1345 345/204 |

(Continued)

OTHER PUBLICATIONS

European Search Report, dated Jan. 30, 2018 for the European patent application No. 17172142.6.

*Primary Examiner* — Shan Liu
(74) *Attorney, Agent, or Firm* — Polsinelli PC

(57) ABSTRACT

A light valve panel and a liquid crystal display using the same are discussed. The light valve panel according to an aspect includes a liquid crystal layer, a first electrode including a block corresponding one-to-one with a light valve data line, and a second electrode facing the first electrode with the liquid crystal layer interposed therebetween. An angle between a vertical edge of the block and the light valve data line is greater than 0° and less than 90°. The liquid crystal display device according to another aspect includes a display panel, a backlight unit, and a light valve panel.

15 Claims, 17 Drawing Sheets

(51) Int. Cl.
  *G02F 1/1343* (2006.01)
  *G02F 1/1347* (2006.01)
  *G02F 1/13357* (2006.01)

(52) U.S. Cl.
  CPC ............ *G02F 2001/133388* (2013.01); *G02F 2001/133601* (2013.01)

(58) Field of Classification Search
  CPC .......... G09G 2300/0426; G09G 3/3659; H01L 27/124; H01L 27/3276; H01L 27/3297
  USPC .......................................... 349/110–111, 139
  See application file for complete search history.

(56) References Cited

U.S. PATENT DOCUMENTS

| | | | | |
|---|---|---|---|---|
| 2007/0046876 | A1* | 3/2007 | Nishikawa | G02F 1/133707 349/125 |
| 2007/0146270 | A1* | 6/2007 | Credelle | G09G 3/3607 345/88 |
| 2009/0147186 | A1* | 6/2009 | Nakai | G02F 1/13471 349/74 |
| 2013/0009159 | A1* | 1/2013 | Song | G02F 1/136286 257/59 |
| 2013/0194521 | A1* | 8/2013 | Whangbo | G02B 27/2214 349/15 |
| 2014/0111719 | A1* | 4/2014 | Sekine | G02F 1/134363 349/41 |
| 2015/0153596 | A1* | 6/2015 | Senokuchi | G02F 1/1339 349/58 |
| 2016/0027380 | A1* | 1/2016 | Kim | G09G 3/3258 315/172 |
| 2016/0093255 | A1* | 3/2016 | Aoki | G09G 3/3426 345/690 |
| 2016/0195756 | A1* | 7/2016 | Oh | G02F 1/134309 349/33 |
| 2016/0291749 | A1* | 10/2016 | Zhou | G06F 3/0412 |
| 2017/0115797 | A1* | 4/2017 | Zheng | G02F 1/13338 |
| 2017/0177125 | A1* | 6/2017 | Kim | G06F 3/0412 |
| 2017/0276982 | A1* | 9/2017 | Nakanishi | G02F 1/1343 |

* cited by examiner

LIGHT VALVE PANEL AND LIQUID CRYSTAL DISPLAY USING THE SAME

CROSS REFERENCE TO RELATED APPLICATION

This application claims the priority benefit of Korean Patent Application No. 10-2016-0067777 filed on May 31, 2016, the entire contents of which is incorporated herein by reference for all purposes as if fully set forth herein.

BACKGROUND

Field of the Disclosure

The present disclosure relates to a liquid crystal display capable of controlling an amount of light incident on a display panel based on a luminance distribution of an input image.

Discussion of the Background

Various flat panel displays, such as a liquid crystal display (LCD), an organic light emitting diode (OLED) display, a plasma display panel (PDP), and an electrophoretic display (EPD), have been developed. A liquid crystal display displays an image by controlling an electric field applied to liquid crystal molecules based on a data voltage. An active matrix liquid crystal display includes a thin film transistor (TFT) at each pixel.

A liquid crystal display includes a display panel having a liquid crystal layer, a backlight unit irradiating light onto the display panel, a source driver integrated circuit (IC) for supplying a data voltage to data lines of the display panel, a gate driver IC for supplying gate pulses (or scan pulses) to gate lines (or scan lines) of the display panel, a control circuit for controlling the source driver IC and the gate driver IC, and a light source driving circuit for driving light sources of the backlight unit.

Gray levels of an input image are produced by the data voltage applied to the pixels of the display panel. A liquid crystal display is not good in displaying a dark image due to the backlight. This is because the backlight unit irradiates the same amount of light onto the entire screen of the display panel regardless of luminance distribution of the input image. Hence, the liquid crystal display has a limited contrast ratio.

SUMMARY

In one aspect, there is provided a light valve panel including a liquid crystal layer, a first electrode arranged in a matrix form and including a block corresponding one-to-one with a light valve data line, and a second electrode facing the first electrode with the liquid crystal layer interposed therebetween. An angle between a vertical edge of the block and the light valve data line is greater than 0° and less than 90°.

In another aspect, there is provided a liquid crystal display device including a display panel on which pixels to which an input image is applied are arranged, a backlight unit irradiating light onto the display panel, and a light valve panel disposed between the display panel and the backlight unit, and which adjusts an amount of light from the backlight unit depending on the input image. The light valve panel includes a liquid crystal layer, a first electrode arranged in a matrix form and including a block corresponding one-to-one with a light valve data line, and a second electrode facing the first electrode with the liquid crystal layer interposed therebetween. An angle between a vertical edge of the block and the light valve data line is greater than 0° and less than 90°.

In a further aspect, a light valve panel having first and second substrates configured to adjust an amount of light from a light source in accordance with an input image to be displayed, the light valve panel includes a first electrode on the first substrate and divided by a plurality of blocks, a light valve data line supplying a light valve voltage to the first electrode, each block corresponding to the light valve data line, a second electrode on the second substrate and facing the first electrode, and liquid crystal molecules between the first and second substrates, wherein the liquid crystal molecules are synchronized with the input image to be displayed by the light valve voltage.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure.

In the drawings.

DETAILED DESCRIPTION

Reference will now be made in example aspects of the disclosure, of which are illustrated in the accompanying drawings. Wherever possible, the same reference numbers will be used throughout the drawings to refer to the same or like parts. It will be paid attention that detailed description of known arts will be omitted.

Figure 1:
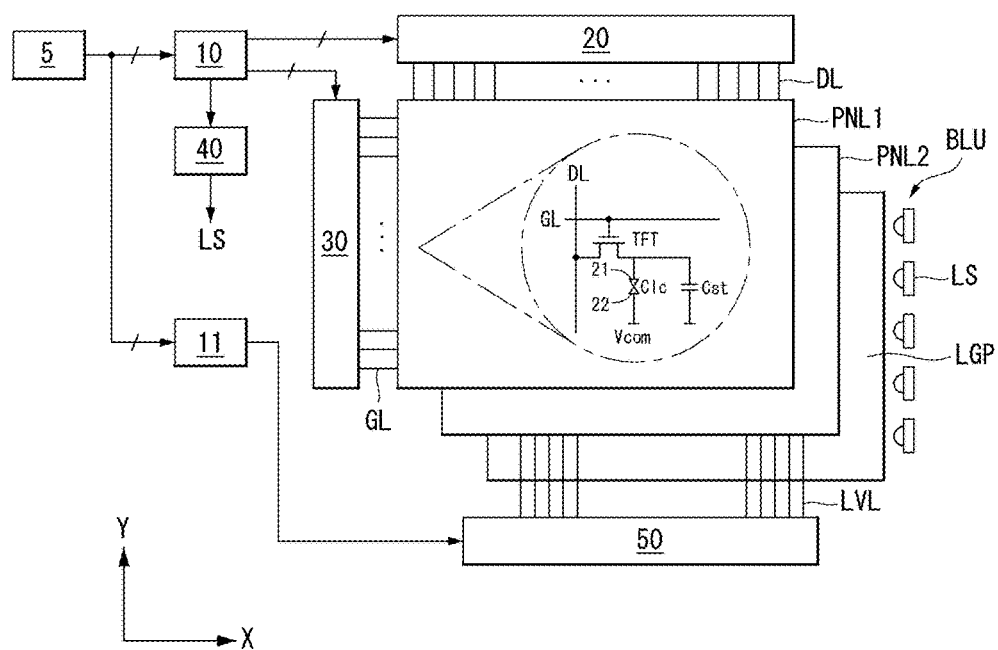
FIG. 1 is a block diagram of a liquid crystal display according to an aspect of the disclosure.
Figure 2:
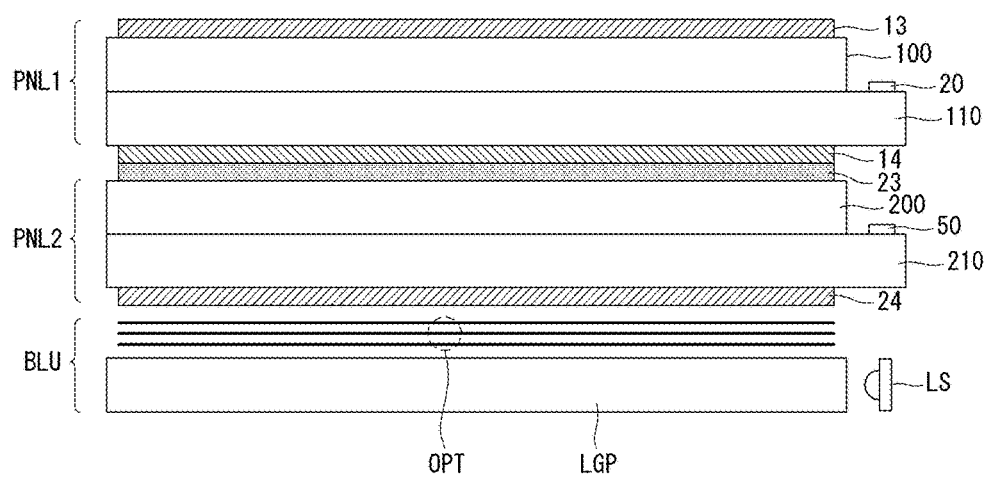
FIG. 2 is a cross-sectional view illustrating a stack structure of a display panel, a light valve panel, and a backlight unit shown in FIG. 1.

Referring to FIGS. 1 and 2, a liquid crystal display according to an aspect of the disclosure includes a display panel PNL1 including a pixel array, a backlight unit BLU irradiating light onto the display panel PNL1, a light valve panel PNL2 disposed between the display panel PNL1 and the backlight unit BLU, a first panel driving circuit 10, 20, and 30, a second panel driving circuit 11 and 50, and a backlight driving circuit 40.

The display panel PNL1 includes a first upper substrate 100 and a first lower substrate 110, which are positioned opposite to each other with a liquid crystal layer interposed therebetween.

On the first upper substrate 100, a color filter array including black matrixes and color filters is formed.

On the first lower substrate 110, data lines DL, gate lines GL, common electrodes 22, pixel electrodes 21 connected to TFTs, storage capacitors Cst connected to the pixel electrodes 21, and the like are formed. The TFTs are respectively formed in subpixels and are connected to the pixel electrodes 21. The TFTs may be implemented as one of an amorphous silicon (a-Si) TFT, a low temperature polysilicon (LTPS) TFT, an oxide TFT, and the like. The TFTs are respectively connected to the pixel electrodes 21 of the subpixels. The common electrode 22 and the pixel electrode 21 are separated from each other with an insulating layer interposed therebetween.

The display panel PNL1 may be implemented as one of liquid crystal modes including a twisted nematic (TN) mode, a vertical alignment (VA) mode, an in-plane switching (IPS) mode, a fringe field switching (FFS) mode, etc.

Polarizing films 13 and 14 are respectively attached to the first upper substrate 100 and the first lower substrate 110 of the display panel PNL1. Alignment layers for setting a pre-tilt angle of liquid crystals are respectively formed on the first upper substrate 100 and the first lower substrate 110 of the display panel PNL1. A spacer for maintaining a cell gap of liquid crystal cells Clc may be formed between the first upper substrate 100 and the first lower substrate 110 of the display panel PNL1.

The light valve panel PNL2 is disposed between the display panel PNL1 and the backlight unit BLU. The light valve panel PNL2 drives liquid crystal molecules based on a difference between the voltages applied to a second upper substrate 200 and a second lower substrate 210 of the light valve panel PNL2 and adjusts an amount of light to be irradiated onto the display panel PNL1. The light valve panel PNL2 acts as a liquid crystal shutter that adjusts an amount of light in synchronization with an input image using electrically controlled liquid crystal molecules.

The liquid crystals of the light valve panel PNL2 may be driven in a TN mode. A luminance of the liquid crystal cell Clc in the TN mode may be adjusted depending on a transmittance-voltage curve (hereinafter, referred to as "T-V curve") of normally white. In the T-V curve of the normally white, as the voltage decreases, the transmittance increases. Hence, the luminance of the liquid crystal cell increases. On the contrary, as the voltage increase, the transmittance decreases. Hence, the luminance of the liquid crystal cell decreases. The structure and operation of the light valve panel PNL2 will be described later in detail.

The display panel PNL1 and the light valve panel PNL2 may be attached to each other using an adhesive 23, for example, an optical clear adhesive (OCA).

The first panel driving circuit 10, 20, and 30 applies data of an input image to the pixels. The first panel driving circuit includes a first timing controller 10, a first data driver 20, and a gate driver 30. The first panel driving circuit 10, 20, and 30 may be integrated into one IC.

The first timing controller 10 transmits digital video data of an input image received from a host system 5 to the first data driver 20. The first timing controller 10 receives timing signals synchronized with the data of the input image from the host system 5. The timing signals include a vertical sync signal Vsync, a horizontal sync signal Hsync, a data enable signal DE, and a clock CLK, etc. The first timing controller 10 controls operation timings of the first data driver 20 and the gate driver 30 based on the timing signals Vsync, Hsync, DE, and CLK received together with pixel data of the input image. The first timing controller 10 may transmit a polarity control signal for controlling a polarity of the pixel array to each of source driver ICs of the first data driver 20.

Output channels of the first data driver 20 are connected to the data lines DL of the pixel array. The first data driver 20 receives the digital video data of the input image from the first timing controller 10. The first data driver 20 converts the digital video data of the input image into positive and negative gamma compensation voltages under the control of the first timing controller 10 and outputs positive and negative data voltages. An output voltage of the first data driver 20 is supplied to the data lines DL. The first data driver 20 inverts a polarity of the data voltage to be supplied to the pixels under the control of the first timing controller 10.

The gate driver 30 sequentially supplies gate pulses synchronized with the data voltage to the gate lines GL under the control of the first timing controller 10. The gate pulses output from the gate driver 30 are synchronized with the data voltage supplied to the data lines DL.

The second panel driving circuit adjusts an amount of light transmitted by the light valve panel PNL2 in synchronization with an input image and improves a contrast ratio of an image reproduced on the display panel PNL1. The second panel driving circuit includes a second timing controller 11 and a second data driver 50. The second timing controller 11 and the second data driver 50 may be integrated into one IC.

The second timing controller 11 transmits data of an input image to the second data driver 50. The second timing controller 11 receives timing signals synchronized with the data of the input image from the host system 5. The timing signals include a vertical sync signal Vsync, a horizontal sync signal Hsync, a data enable signal DE, and a clock CLK, etc. The second timing controller 11 controls operation timing of the second data driver 50 based on the timing signals Vsync, Hsync, DE, and CLK received together with pixel data of the input image.

The second data driver 50 receives digital video data of an input image from the second timing controller 11. The second data driver 50 converts the digital video data of the input image into positive and negative gamma compensation voltages under the control of the second timing controller 11 and outputs positive and negative data voltages. An output voltage of the second data driver 50 is supplied to data lines LVL. The second data driver 50 inverts a polarity of the data voltage to be supplied to the pixels under the control of second timing controller 11.

The first and second panel driving circuits may be integrated in various types. For example, the first and second timing controllers 10 and 11 may be integrated into one IC. The first and second panel driving circuits may be integrated into one IC.

The backlight unit BLU may be implemented as a direct type backlight unit or an edge type backlight unit. The backlight unit BLU includes light sources LS, a light guide plate LGP, an optical sheet OPT, and the like. The light source LS may be implemented as a point light source such as a light emitting diode (LED). Luminances of the light sources LS are individually adjusted depending on a driving voltage supplied by a backlight unit driver 40. The optical sheet OPT includes one or more prism sheets and one or more diffuser sheets. The optical sheet OPT diffuses light incident from the light guide plate LGP and refracts a travelling path of light at an angle substantially vertical to a light incident surface of the display panel PNL1.

The host system 5 may be one of a television system, a set-top box, a navigation system, a DVD player, a Blu-ray player, a personal computer (PC), a home theater system, and a phone system.

The liquid crystal display according to the aspect of the disclosure further includes a power unit, which is not illustrated in the drawings. The power unit generates voltages required to drive the display panel PNL1 and the light valve panel PNL2 using a DC-DC converter. The voltages includes a high potential power voltage VDD, a logic power voltage VCC, a gamma reference voltage, a gate high voltage VGH, a gate low voltage VGL, a common voltage Vcom, and other voltages. The high potential power voltage VDD is a maximum value of the data voltage, to which pixels of the display panel PNL1 will be charged. The logic power voltage VCC is an IC power voltage of the first and second panel driving circuits. The gate high voltage VGH is a high logic voltage of the gate pulse, which is set to be equal to or greater than a threshold voltage of the TFTs of the pixel array. The gate low voltage VGL is a low logic voltage of the gate pulse, which is set to be less than the threshold voltage of the TFTs of the pixel array. The gate high voltage VGH and the gate low voltage VGL are supplied to the gate driver 30. The gate pulse swings between the gate high voltage VGH and the gate low voltage VGL. The common voltage Vcom is supplied to the common electrode 22 of the liquid crystal cells Clc. The power unit divides the high potential power voltage VDD and generates the gamma reference voltage. The gamma reference voltage is divided by a voltage divider circuit installed inside the first data driver 20 and is divided into positive and negative gamma compensation voltages depending on a gray scale.

The light valve panel PNL2 precisely controls an amount of light irradiated onto each pixel in synchronization with data of an input image displayed on the pixel array and maximizes a contrast ratio of an image reproduced on the display panel PNL1. The detailed features will be described with reference to FIG. 3.

Figure 3:
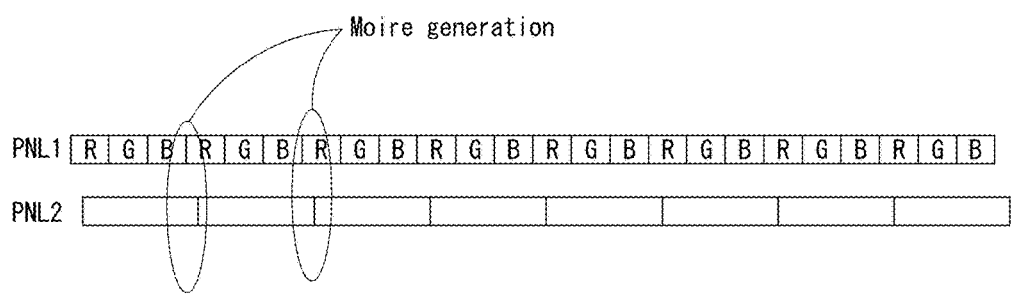
FIG. 3 illustrates a moire pattern caused by an inference of light generated when metal lines of a display panel and metal lines of a light valve panel overlap each other.

Lines are formed on each of the display panel PNL1 and the light valve panel PNL2. These lines are not transparent and may be formed as metal lines having a high reflectance. The metal lines include data lines in a vertical direction, gate lines in a horizontal direction, and common lines in the horizontal direction. The common lines are connected to the common electrodes of the pixels and supply the common voltage Vcom to the common electrodes. Because the metal lines having the high reflectance lead to a reduction in the contrast ratio by reflecting external light, the metal lines and the TFTs are covered by a black matrix pattern. In this instance, when the lines of the display panel PNL1 overlap the lines of the light valve panel PNL2, the moire phenomenon may be generated in the vertical and horizontal directions due to interference of light if a misalignment is generated as shown in FIG. 3. In order to reduce the moire phenomenon, a diffuser sheet diffusing light may be disposed between the display panel PNL1 and the light valve panel PNL2. On the other hand, the aspect of the disclosure removes the horizontal lines from the light valve panel PNL2 and forms the electrodes of the upper and lower substrates and the lines using a transparent electrode material, thereby minimizing the moire phenomenon without adding the diffuser sheet.

Figure 4:
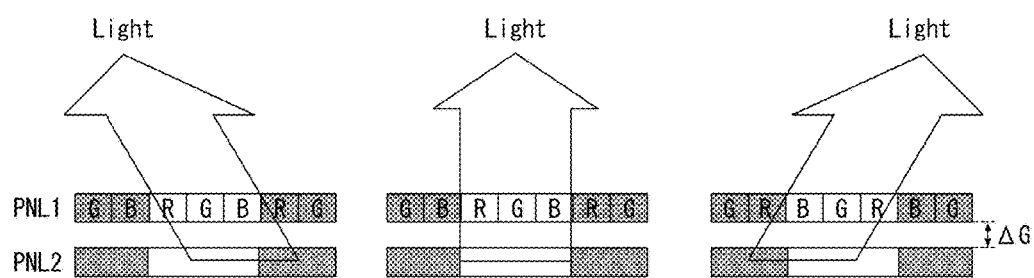
FIG. 4 illustrates a distortion of color generated by a gap between a display panel and a light valve panel.

When a user watches the liquid crystal display from a front viewing angle, the user may watch an image at a desired luminance. However, when the user watches the liquid crystal display from side viewing angles, a luminance and a color of the image may change. As shown in the middle diagram of FIG. 4, the front viewing angle is a viewing angle obtained when the user watches a display surface of the display panel PNL1 at an angle of 90°. The side viewing angle is a viewing angle obtained when the user watches the display surface of the display panel PNL1 at an angle leaned to the left side or the right side. In FIG. 4, a left diagram is shown at a left viewing angle of 45°, and a right diagram is shown at a right viewing angle of 45°. In particular, because a predetermined gap ΔG is unconditionally formed between the display panel PNL1 and the light valve panel PNL2, a color distortion of the liquid crystal display including the light valve panel PNL2 may more obviously appear from the side viewing angles. In FIG. 4, only blocks of the light valve panel PNL2 positioned under pixels represented with white color transmit light, and other blocks of the light valve panel PNL2 block light. In this instance, when the user watches the liquid crystal display from the side viewing angles, luminances of some colors are reduced, and the color distortion appears. A method for adjusting a luminance of the light valve panel PNL2 shown in FIG. 5 may be considered, so as to improve the luminance of the side viewing angles. It should be noted that an example illustrated in FIG. 5 is not a related art.

Figure 5:
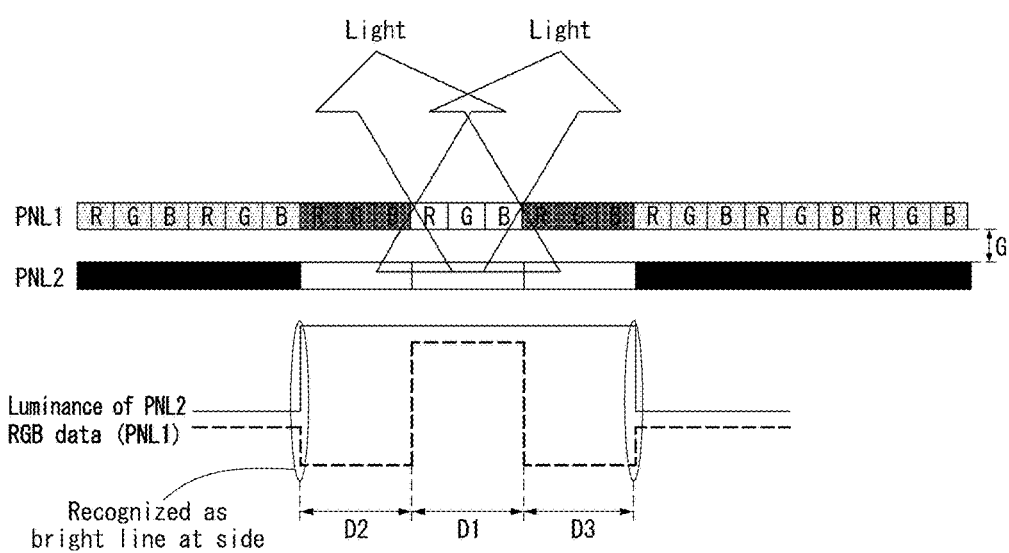
FIG. 5 illustrates an example of a distorted bright line caused when a dark block adjacent to a bright block in a light valve panel is turned on so as to prevent color distortion of a side viewing angle.

FIG. 5 illustrates an example of a distorted bright line appearing when a dark block adjacent to a bright block of the light valve panel PNL2 is turned on so as to prevent the color distortion of the side viewing angles. The bright block is disposed under a bright pixel (hereinafter, referred to as "ON-pixel") of the display panel PNL1 and means a block (hereinafter, referred to as "ON-block") of the light valve panel PNL2 irradiating light onto the ON-pixel. The bright pixel is a pixel to which data of a high gray level, for example, a white gray level is applied. The dark block means a block (hereinafter, referred to as "OFF-block") of the light valve panel PNL2 disposed under a dark pixel (hereinafter, referred to as "OFF-pixel") adjacent to the ON-pixel of the display panel PNL1. The dark pixel is a pixel to which data of a low gray level, for example, a black gray level lower than the gray level of the ON-pixel is applied. As shown in FIG. 5, when luminances of the OFF-blocks adjacent to the ON-block increase, each of red, green, and blue data at the side viewing angles can be seen to have a desired luminance. Therefore, the color distortion at the side viewing angles can be reduced or prevented. On the other hand, when luminances of the OFF-blocks increase, luminances of the OFF-pixels may increase. Hence, luminances of the OFF-pixels at the front viewing angle may increase. In order to compensate for a reduction in image quality at the front viewing angle, the luminance of the OFF-pixel may be decreased using a modulation method for reducing a data value of the OFF-pixel adjacent to the ON-pixel. However, the modulation method may lead to the bright line phenomenon, in which a boundary between the OFF-pixel receiving data and the OFF-pixel receiving original data looks bright.

The aspect of the disclosure adjusts a luminance of the light valve panel PNL2 through a gradation method by distributing the voltage to the block in a manner that a luminance of the OFF-block adjacent to the ON-block in the light valve panel PNL2 gradually changes, so as to reduce the luminance and the color distortion at the side viewing angles and prevent the bright line phenomenon. Further, the aspect of the disclosure may control a gray level of the OFF-pixel adjacent to the ON-pixel in reverse of a gradation luminance control method of the OFF-block.

Figure 6:
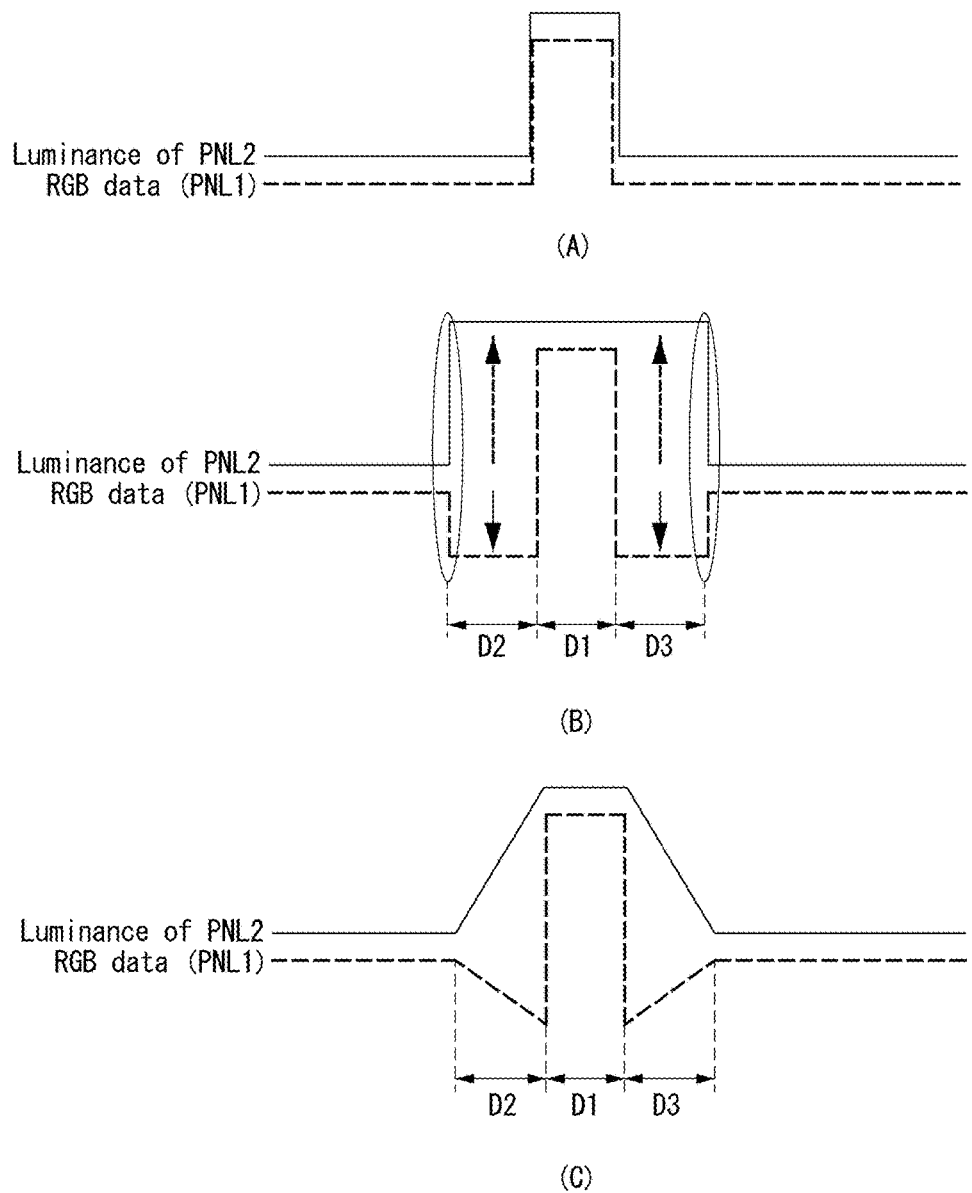
FIG. 6 illustrates a pixel data modulation method of a display panel and a block luminance control method of a light valve panel.
Figure 7:
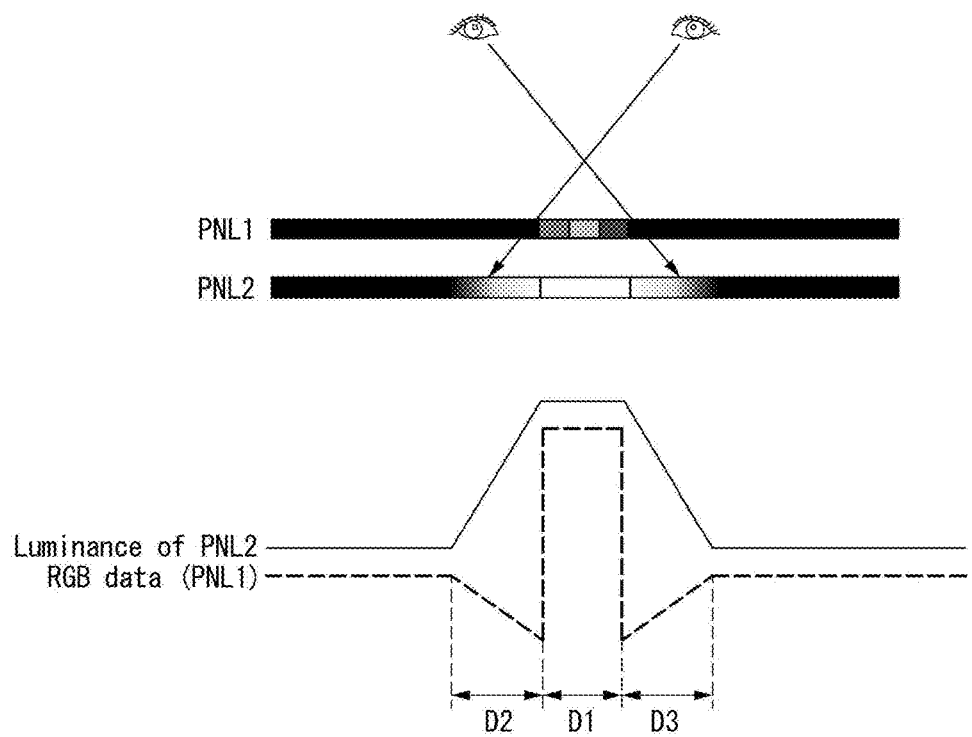
FIG. 7 illustrates a luminance of a pixel at a side viewing angle when data and a luminance of a display panel are controlled through a control method illustrated in (C) of FIG. 6.

FIG. 6 illustrates a pixel data modulation method of the display panel and a block luminance control method of the light valve panel. FIG. 7 illustrates a luminance of a pixel at a side viewing angle when data and a luminance of the display panel are controlled through a control method illustrated in (C) of FIG. 6.

In FIG. 6, D1 denotes a location of an ON-pixel and a location of an ON-block under the ON-pixel. D2 and D3 respectively denote a location of an OFF-pixel and a location of an OFF-block under the OFF-pixel.

More specifically, (A) in FIG. 6 illustrates an example where data of a high gray level is applied only to an ON-pixel, and only an ON-block is turned on at a high luminance. (B) in FIG. 6 illustrates a method for increasing a luminance of an OFF-block adjacent to the ON-block by a luminance of the ON-block and reducing a gray level of data to be applied to an OFF-pixel adjacent to the ON-pixel, so as to improve a side viewing angle.

(C) in FIG. 6 and FIG. 7 illustrate a method for gradually reducing a luminance of an OFF-block as the OFF-block is far away from the ON-block while increasing the luminance of the OFF-block adjacent to the ON-block by a luminance of the ON-block, so as to improve a side viewing angle and a bright line. Each block of the light valve panel PNL2 is disposed under pixels of the display panel PNL1 and irradiates light onto the pixels. Thus, there are OFF-pixels in the OFF-block adjacent to the ON-block, and gray levels of the OFF-pixels can be individually adjusted as shown in (C) of FIG. 6 and FIG. 7. The pixel data modulation method may use the gradation method shown in (C) of FIG. 6. Other methods may be used. For example, a luminance of the light valve panel PNL2 may use the gradation method of (C) in FIG. 6, and the pixel data modulation method may use the method shown in (B) or (C) of FIG. 6.

Figure 8:
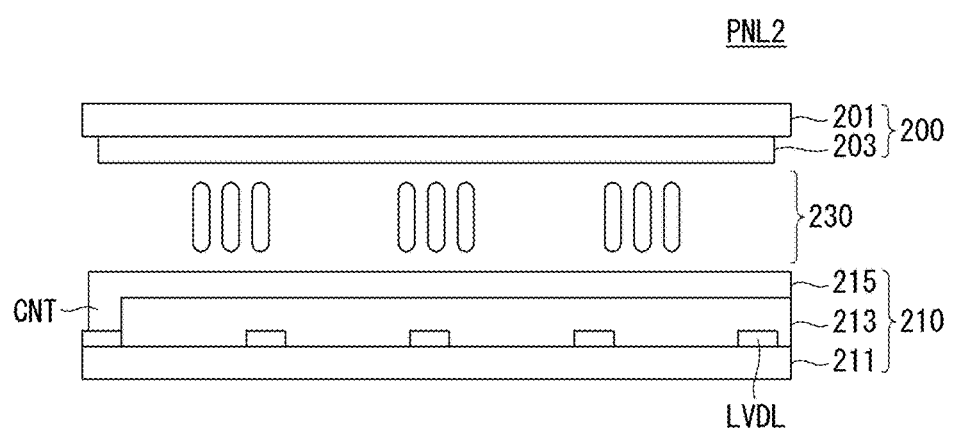
FIG. 8 is a cross-sectional view of a light valve panel.

FIG. 8 is a cross-sectional view of a light valve panel.

Referring to FIG. 8, the light valve panel PNL 2 includes a second upper substrate 200 and a second lower substrate 210.

The second upper substrate 200 includes a first base substrate 201 and a second electrode 203. The second electrode 203 may be formed of a transparent electrode material such as indium tin oxide (ITO). The second upper substrate 200 may include a black matrix (BM) if necessary. Hereinafter, the second electrode 203 will be referred to as an upper electrode 203 in this specification.

The second lower substrate 210 includes a second base substrate 211, a light valve data line LVDL, and a first electrode 215. Hereinafter, the first electrode 215 will be referred to as a lower electrode 215 in this specification.

The lower electrode 215 may be formed of a transparent electrode material such as ITO. The lower electrode 215 is disposed over the entire surface of the second lower substrate 201 of the light valve panel PNL2. The light valve data line LVDL is formed of a transparent electrode material such as indium tin oxide (ITO) and indium zinc oxide (IZO). The light valve data line LVDL may be formed of a transparent electrode, so as to prevent the moire phenomenon but is not limited thereto. The light valve data line LVDL may be formed of a low resistance metal, so as to compensate for a resistance of the transparent electrode.

The light valve data lines LVDL are connected to the lower electrode 215 through a contact hole CNT to directly supply a light valve data voltage. Therefore, the light valve panel PNL2 does not need a TFT or a gate line (or a scan line). Hence, the aspect of the disclosure can prevent a moire phenomenon and a bright line phenomenon and can further reduce the number of manufacturing processes of the light valve panel PNL2 by simplifying a structure of the light valve panel PNL2, thereby increasing a yield. Further, the aspect of the disclosure omits a gate driving circuit for driving the light valve panel PNL2 and thus can implement a lower cost light valve panel PNL2.

A polarizing film 24 (shown in FIG. 2) is attached to the second lower substrate 210 of the light valve panel PNL2. A liquid crystal layer 230 is formed between the second upper substrate 200 and the second lower substrate 210. Alignment layers are respectively formed on the surfaces contacting the liquid crystal layer 230 at the second upper substrate 200 and the second lower substrate 210 of the light valve panel PNL2. A spacer for maintaining a cell gap of the liquid crystal cells may be formed between the second upper substrate 200 and the second lower substrate 210 of the light valve panel PNL2.

Figure 9:
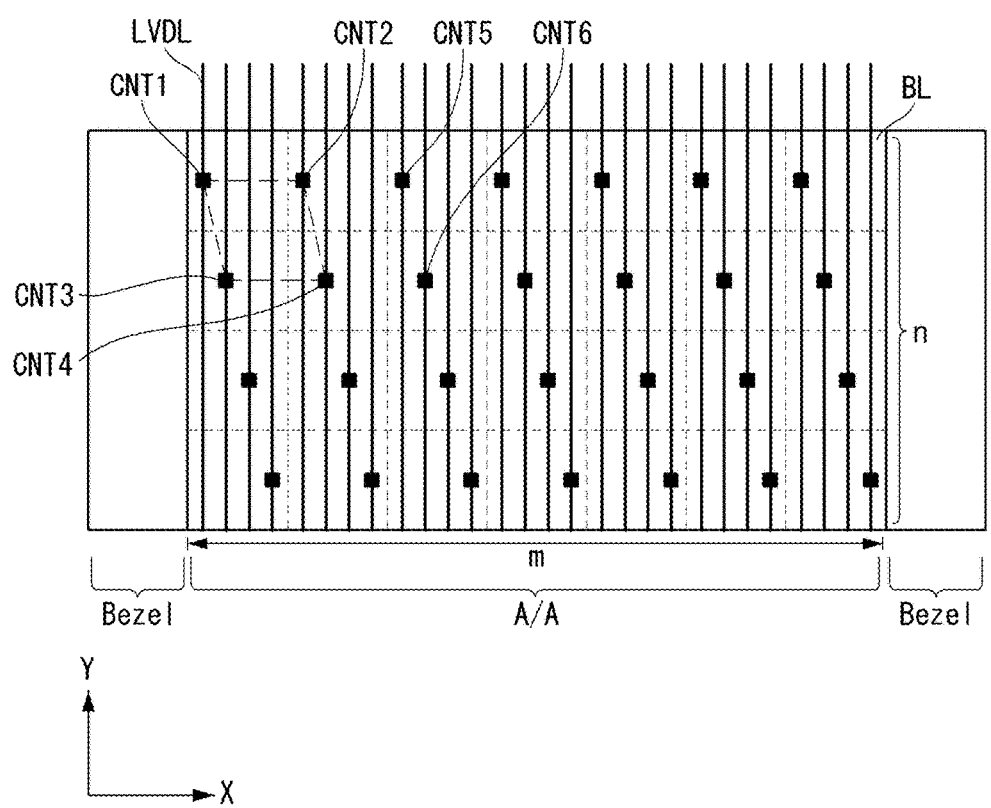
FIGS. 9 and 10 are a view illustrating block division of a light valve panel according to an aspect of the disclosure.

FIG. 9 is a view illustrating block division of a light valve panel according to a first aspect of the disclosure.

Referring to FIGS. 8 and 9, the lower electrode 215 of the light valve panel PNL2 includes an active area A/A and a bezel area Bezel. There are m×n blocks BL arranged in the active area A/A.

Figure 10:
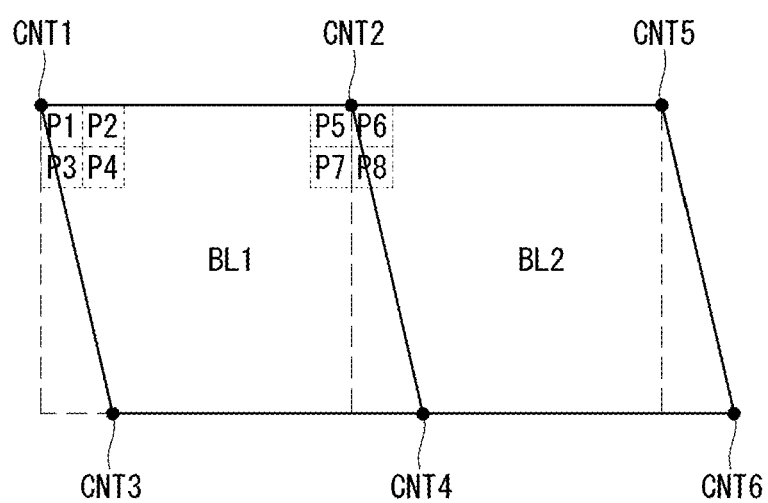

The light valve data lines LVDL are parallel with each other and arranged in a vertical direction (a y-axis direction) in the active area A/A. Each of the light valve data lines LVDL is connected to blocks BL through a contact hole CNT. The light valve data voltage supplied to the lower electrode through the contact hole CNT is distributed to an area of the block BL. For example, in FIG. 10, when a voltage of 10 V is applied through a first contact hole CNT1, the voltage close to 10 V is applied to first to fourth pixels P1, P2, P3 and P4 close to the first contact hole CNT1. When a voltage of 0V is applied through a second contact hole CNT2, the voltage close to 0V is applied to fifth to eighth pixels P5, P6, P7 and P8 close to the second contact hole CNT2.

The light valve data lines LVDL are arranged vertically in parallel with a column direction (a y-axis direction) of the pixels P. Each of the light valve data lines LVDL is arranged so as to connect an upper end and a lower end of the light valve panel PNL2 in a straight line. As a result, the light valve data lines LVDL are arranged evenly over the entire surface of the light valve panel PNL2.

Because the light valve data lines LVDL are evenly distributed over the entire surface of the light valve panel PNL2, it is possible to improve an occurrence of a transmittance difference due to uneven distribution of the light valve data lines LVDL.

The aspect shown in FIG. 9 will be described with reference to a comparative example shown in FIG. 11 as follows.

Figure 11:
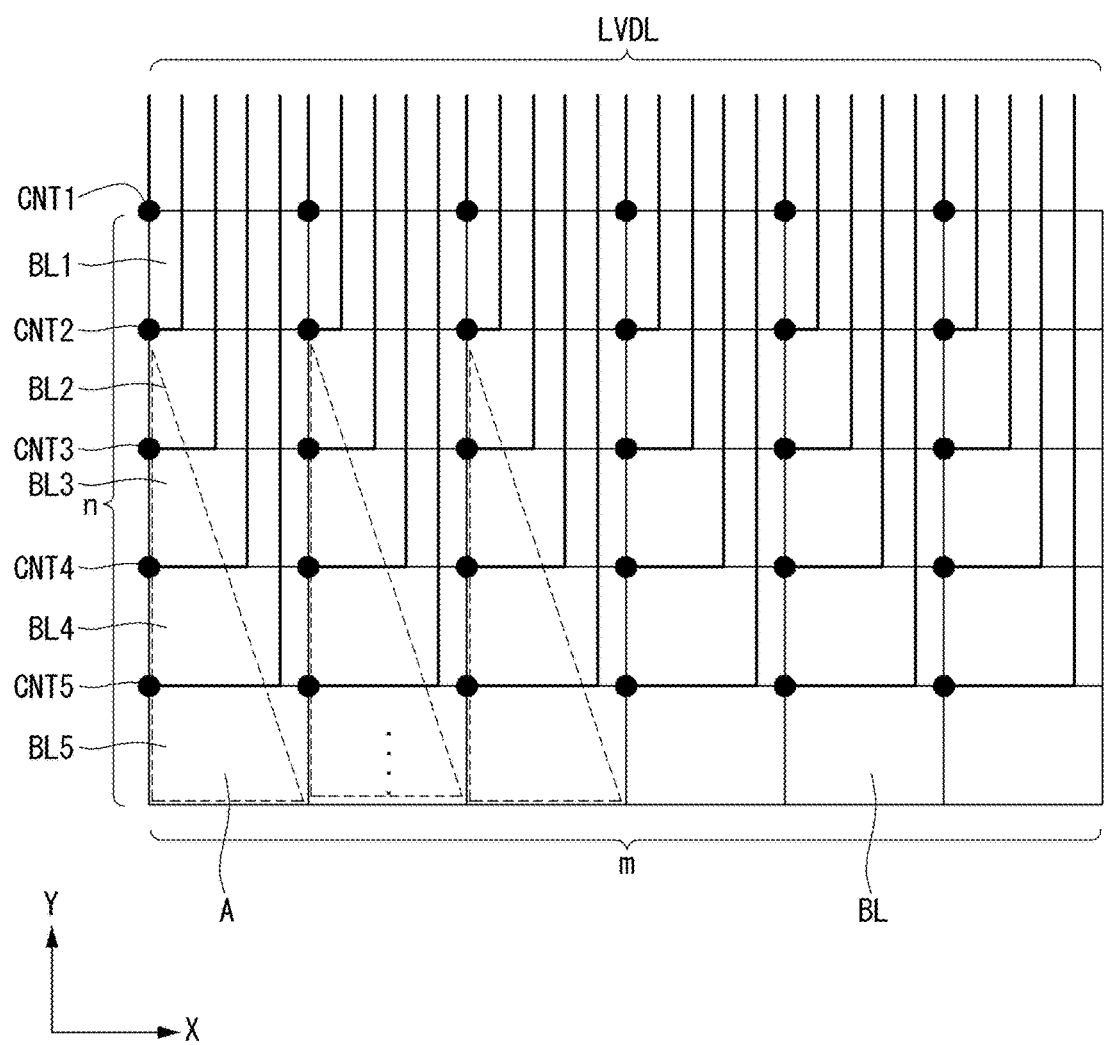
FIGS. 11 and 12 are a view illustrating block division of a light valve panel according to a comparative example.

In the comparative example shown in FIG. 11, contact holes CNT connected to each of blocks BL disposed in the same column are located on the same vertical axis (y axis).

Figure 12:
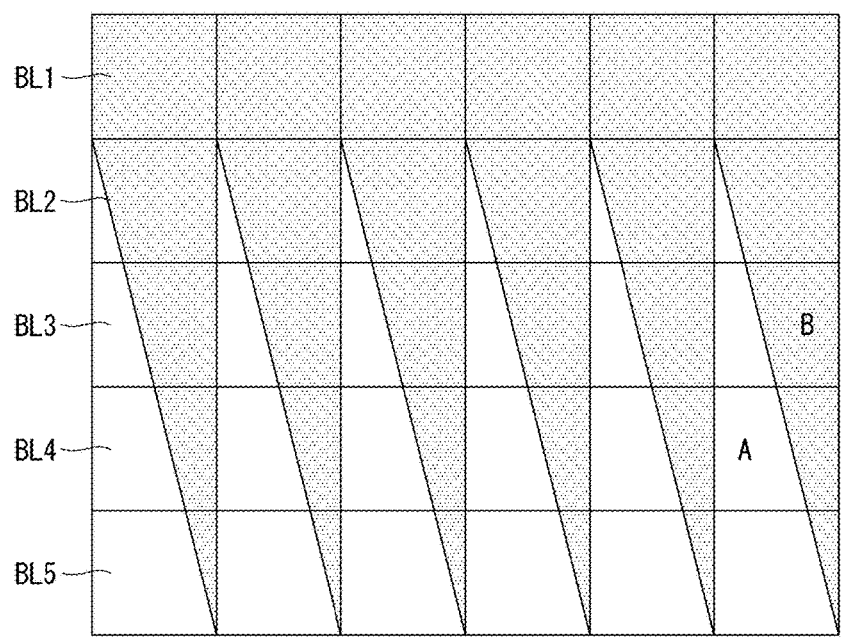

For example, first to fifth contact holes CNT1 to CNT5 of a first column connected to first to fifth blocks BL1 to BL5 disposed in the first column are arranged on the same vertical axis. The light valve data lines LVDL corresponding one-to-one relationship with the respective contact holes CNT are bent at the right angle in a state in which they are arranged in parallel with each other and are connected to the respective contact holes CNT. As a result, in the comparative example shown in FIG. 11, a density of an area in which the light valve data lines LVDL are arranged in the light valve panel PNL2 is changed. As shown in FIG. 12, an area A without vertical portions of the light valve data lines LVDL has a higher light transmittance than an area B where the vertical portions of the light valve data lines LVDLs are disposed. That is, in the comparative example, a difference in light transmittance occurs between the area A and the other areas depending on whether or not the light valve data lines LVDL are arranged. If a difference in light transmittance occurs in a planar area of the light valve panel PNL2, there is a problem that a luminance difference occurs in an image displayed on the display panel PNL1.

On the contrary, in the light valve panel PNL2 shown in FIG. 9, since the light valve data lines LVDL are evenly arranged in the planar area of the light valve panel PNL2, a difference in light transmittance due to presence or absence of the arrangement of the light valve data lines LVDL can be improved.

Figure 13:
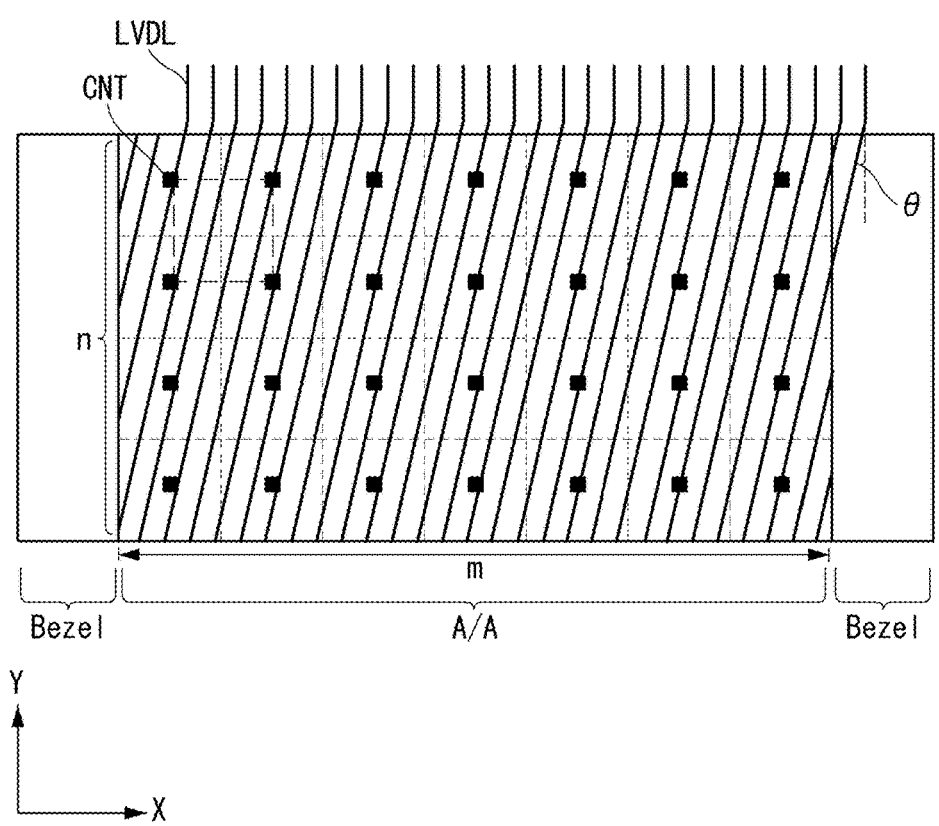
FIG. 13 is a view illustrating block division of a light valve panel according to another aspect of the disclosure.

FIG. 13 is a view illustrating block division of a light valve panel according to another aspect of the disclosure. A sectional structure of the light valve panel PNL2 according to the another aspect is the same as that of FIG. 8.

Referring to FIGS. 8 and 13, the light valve data lines LVDL are formed in an oblique direction with respect to the vertical direction. The light valve data lines LVDL each are connected to the blocks BL of the lower electrode 215 through contact holes CNT. The contact holes CNT are arranged at regular intervals along a row direction and at regular intervals along a column direction. The intervals between the contact holes CNT in the row direction and the intervals between the contact holes CNT in the column direction may be different from each other. A line segment connecting the contact holes CNT arranged in the row direction and a line segment connecting the contact holes CNT arranged in the column direction are orthogonal. As a result, vertical line segments connecting the contact holes CNT arranged in the column direction can coincide with boundaries of the pixels P of the display panel PNL1 on a plane.

In the light valve panel PNL2 according to the another aspect, the light valve data line LVDL is evenly distributed in the active area A/A as in the first aspect. Accordingly, the light valve panel PNL2 according to the another aspect can improve a difference in light transmittance due to presence or absence of the arrangement of the light valve data lines LVDL.

In the light valve panel PNL2 according to the another aspect, since the line segment connecting the contact holes CNT and the boundary line of the pixels P in the display panel PNL1 coincide on a plane, it is easy to determine a light valve data voltage.

The light valve data voltage of the light valve panel PNL2 is determined based on an image data of the pixels P. In particular, the light valve data voltage is determined based on the pixels P included in the block BL unit.

In the aspect shown in FIG. 9, since the blocks BL of the light valve panel PNL2 are defined in a parallelogram shape, it is not easy to determine the pixels P included in each block BL. When the light valve data voltage is determined based on the comparative example in which the vertical line segments connecting the contact holes CNT are straight lines, there is a problem that the image is distorted around the line segments connecting the contact holes CNT.

On the contrary, in the light valve panel PNL2 of the another aspect, since the blocks BL are formed in a rectangular shape and the boundaries of the blocks BL and the boundaries of the pixels P coincide with each other, it is easy to determine the light valve data voltage. As a result, a distortion of the image pattern at the boundary between the blocks BL can be improved.

Figure 14:
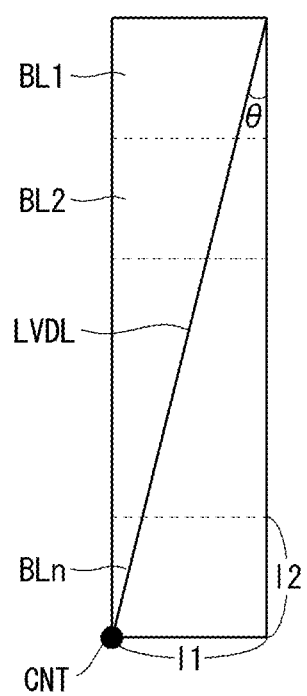
FIG. 14 is a schematic diagram illustrating a method for determining an angle of light valve data line.

FIG. 14 is a schematic diagram illustrating a method for determining an angle θ of light valve data lines LVDL. The angle θ of the light valve data lines LVDL in the present disclosure is defined as an interior angle formed by the light valve data line LVDL and a vertical axis y of the blocks BL.

The light valve data lines LVDL arranged on a side edge of the active area A/A are arranged obliquely in a bezel area. Therefore, when the angle θ of the light valve data lines LVDL increases, there is a disadvantage that the bezel area increases. In addition, when the angle θ of the light valve data lines LVDL is too narrow, there arises an area where an interval between the light valve data lines LVDL is not uniformly arranged.

A horizontal width interval at a point where the light valve data lines LVDL are in contact with upper and lower portions of the active area A/A is set to correspond to a horizontal width length l1 of one block BL. As a result, a width of the bezel can be made equal to the horizontal width length l1 of the block BL.

The angle θ of the light valve data lines LVDL may be set by the following equation 1.

$$\tan \theta = L1/(L2 \times N) \qquad \text{[Equation 1]}$$

In Equation 1, L1 denotes a horizontal width of the block BL, L2 denotes a vertical width of the block BL, and N is the number of rows of the block BL.

Figure 15:
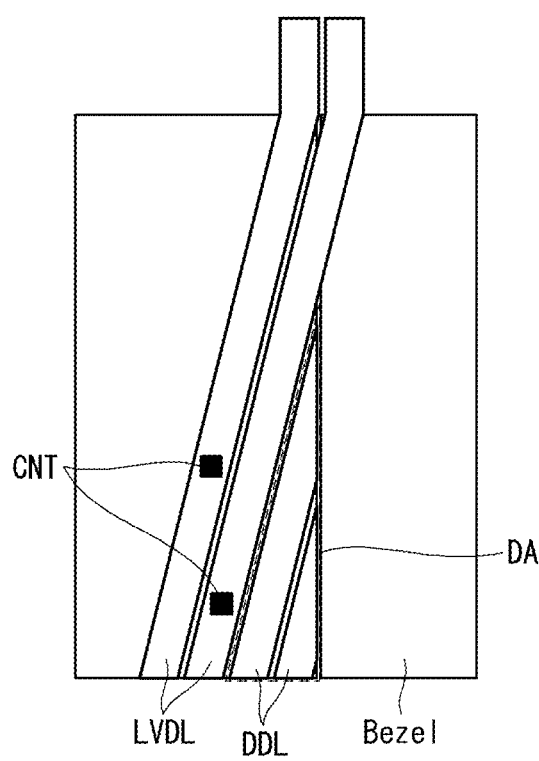
FIGS. 15 to 17 illustrate dummy data lines according to the present disclosure.
Figure 16:
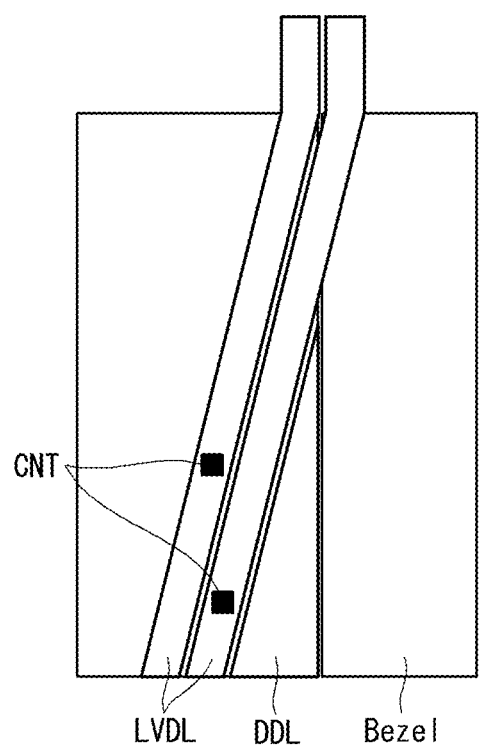
Figure 17:
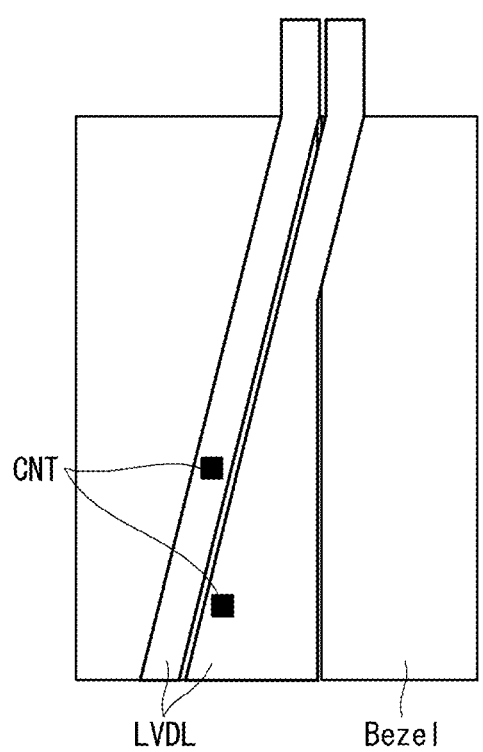

FIGS. 15 to 17 illustrate dummy data lines DDL according to the present disclosure.

In the vicinity of the edge of the active area A/A, there may be a dummy area DA in which the light valve data line LVDL is not disposed. The dummy area DA is an image display area included in the active area A/A and is referred to as an area where the light valve data line LVDL is not disposed. Since a light transmittance is high in the dummy area DA, a difference in luminance may arise between the dummy area DA and the area where the light valve data line LVDL is disposed.

To improve this, a dummy data line DDL is formed in the dummy area DA as shown in FIGS. 15 to 17.

Referring to FIG. 15, a plurality of dummy data lines DDL have the same width as that of light valve data lines LVDL. The dummy data line DDL is not electrically connected to the lower electrode 215. The dummy data line DDL allows the light transmittance to be evenly distributed over the entire surface of the active area A/A.

Alternatively, as shown in FIG. 16, a dummy data line DDL can be disposed in a large width so as to cover an edge area where a light valve data line LVDL is not disposed in the active area A/A.

FIG. 17 illustrates an aspect in which a width of a light valve data line LVDL is different to cover an edge area of an active area A/A. The last light valve data line LVDL shown in FIG. 17 is patterned so as to cover the dummy area in the active area A/A. This dummy line DDL can improve a difference in transmittance depending on whether the light valve data lines LVDL are disposed or not.

Although aspects have been described with reference to a number of illustrative aspects thereof, it should be understood that numerous other modifications and aspects can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light valve panel including an active area and a bezel area located outside the active area, comprising:
    a first electrode disposed on an entire surface of a first substrate of the light valve panel and defined by a plurality of blocks located in the active area and the bezel area is located where the plurality of blocks is not disposed;
    a plurality of light valve data lines connected to the first electrode through a plurality of contact holes and directly supplying a light valve data voltage to the first electrode without a thin film transistor, a gate line and a scan line in the light valve panel, wherein each block corresponds to each light valve data line and more than one pixels, so that the more than one pixels in close proximity to the plurality of contact holes are supplied with a voltage close to the light valve data voltage supplied to the first electrode; and
    a second electrode on a second substrate and facing the first electrode,
    wherein the light valve panel adjusts an amount of light to be emitted by a difference in voltages supplied to the first and second electrodes,
    wherein the plurality of the light valve data lines extends in parallel within the active area in an oblique direction with respect to a vertical edge along a Y-axis direction of the active area and forms an angle ($\theta$) with respect to a vertical edge along the Y-axis direction of each block in the active area, and four corners of each block are defined by four vertically (the Y-axis direction) and horizontally (an X-axis direction) adjacent contact holes of the plurality of contact holes, and
    wherein the angle ($\theta$) between the plurality of light valve data lines and the vertical edge along the Y-axis direction of each block in the active area is determined by an equation of $\tan \theta = L1/(L2 \times N)$, where L1 is a length of a horizontal edge of each block, L2 is a length of the vertical edge of each block and N is a number of rows of the blocks in the active area.

2. The light valve panel of claim 1, wherein the bezel area has a width substantially the same as a horizontal width of the plurality of blocks.

3. The light valve panel of claim 2, wherein a tangent of an angle is the horizontal width of the plurality of blocks divided by a vertical width of the active area.

4. The light valve panel of claim 1, wherein
    the plurality of contact holes is disposed in parallel with a vertical edge of the plurality of blocks.

5. The light valve panel of claim 1, further comprising a dummy line disposed at a dummy area where the light valve data line is not disposed at the active area.

6. A liquid crystal display device comprising:
    a display panel including a plurality of pixels to which an input image is applied;
    a backlight unit irradiating light onto the display panel; and
    a light valve panel disposed between the display panel and the backlight unit, the light valve panel configured to adjust an amount of the irradiated light from the backlight unit depending on the input image,
    wherein the light valve panel where an active area and a bezel area located outside the active area are defined, the light valve panel includes:
    a liquid crystal layer;
    a first electrode disposed on an entire surface of a first substrate of the light valve panel and defined by a plurality of blocks located in the active area and the bezel area is located where the plurality of blocks is not disposed;
    a plurality of light valve data lines connected to the first electrode through a plurality of contact holes and directly supplying a light valve data voltage to the first electrode without a thin film transistor, a gate line and a scan line in the light valve panel, wherein each block corresponds to each light valve data line and more than one pixels, so that the more than one pixels in close proximity to the plurality of contact holes are supplied with a voltage close to the light valve data voltage supplied to the first electrode; and
    a second electrode on a second substrate and facing the first electrode with the liquid crystal layer interposed therebetween,
    wherein the light valve panel adjusts an amount of light to be emitted by a difference in voltages supplied to the first and second electrodes,
    wherein the plurality of the light valve data lines extends in parallel within the active area in an oblique direction with respect to a vertical edge along a Y-axis direction of the active area and forms an angle ($\theta$) with respect to a vertical edge along the Y-axis direction of each block in the active area, and four corners of each block are defined by four vertically (the Y-axis direction) and horizontally (an X-axis direction) adjacent contact holes of the plurality of contact holes, and
    wherein the angle ($\theta$) between the plurality of light valve data lines and the vertical edge along the Y-axis direction of each block in the active area is determined by an equation of $\tan \theta = L1/(L2 \times N)$, where L1 is a length of a horizontal edge of each block, L2 is a length of the vertical edge of each block and N is a number of rows of the blocks in the active area.

7. The liquid crystal display device of claim 6, wherein the bezel area has a width substantially equal to a horizontal width of the plurality of blocks.

8. The liquid crystal display device of claim 7 wherein a tangent of an angle is the horizontal width of the plurality of blocks divided by a vertical width of the active area.

9. The liquid crystal display device of claim 6,
    the plurality of contact holes is disposed in parallel with a vertical edge of the plurality of blocks.

10. The liquid crystal display device of claim 6, further comprising a dummy line disposed at a dummy area where the plurality of light valve data lines—is not disposed at the active area.

11. A light valve panel having first and second substrates configured to adjust an amount of light from a light source in accordance with an input image to be displayed, and including an active area and a bezel area located outside the active area are defined, the light valve panel comprising:
- a first electrode disposed on an entire surface of the first substrate and defined by a plurality of blocks located in the active area and the bezel area is located where the plurality of blocks is not disposed;
- a plurality of light valve data lines connected to the first electrode through a plurality of contact holes and directly supplying a light valve data voltage to the first electrode without a thin film transistor, a gate line and a scan line in the light valve panel, wherein each block corresponds to each light valve data line and more than one pixels, so that the more than one pixels in close proximity to the plurality of contact holes are supplied with a voltage close to the light valve data voltage supplied to the first electrode;
- a second electrode on the second substrate and facing the first electrode; and
- liquid crystal molecules between the first and second substrates, wherein the liquid crystal molecules are synchronized with the input image to be displayed by the light valve voltage,
- wherein the light valve panel adjusts an amount of light to be emitted by a difference in voltages supplied to the first and second electrodes,
- wherein the plurality of the light valve data lines extends in parallel within the active area in an oblique direction with respect to a vertical edge along a Y-axis direction of the active area and forms an angle ($\theta$) with respect to a vertical edge along the Y-axis direction of each block in the active area, and four corners of each block are defined by four vertically (the Y-axis direction) and horizontally (an X-axis direction) adjacent contact holes of the plurality of contact holes, and
- wherein the angle ($\theta$) between the plurality of light valve data lines and the vertical edge along the Y-axis direction of each block in the active area is determined by an equation of $\tan \theta = L1/(L2 \times N)$, where L1 is a length of a horizontal edge of each block, L2 is a length of the vertical edge of each block and N is a number of rows of the blocks in the active area.

12. The light valve panel of claim 11, wherein the vertical edge of each block and each light valve data line forms the angle ($\theta$) between 0° and 90°.

13. The light valve panel of claim 11, further comprising a dummy line disposed at a dummy area where the plurality of light valve data lines—is not disposed, wherein the dummy line is electrically insulated from the first electrode.

14. The light valve panel of claim 11, wherein the plurality of contact holes is disposed in parallel with the vertical edge of each block.

15. The light valve panel of claim 11, wherein a tangent of an angle is a horizontal width of the plurality of blocks divided by a vertical width of the light valve panel.

* * * * *